(12) United States Patent
Matsushita et al.

(10) Patent No.: US 9,377,357 B2
(45) Date of Patent: Jun. 28, 2016

(54) TUNABLE INTERFERENCE FILTER HAVING COMMUNICABLE GROOVE PART, OPTICAL FILTER MODULE, AND PHOTOMETRIC ANALYZER

(75) Inventors: Tomonori Matsushita, Chino (JP); Yasushi Matsuno, Matsumoto (JP)

(73) Assignee: Seiko Epson Corporation (JP)

( * ) Notice: Subject to any disclaimer, the term of this patent is extended or adjusted under 35 U.S.C. 154(b) by 453 days.

(21) Appl. No.: 13/548,578

(22) Filed: Jul. 13, 2012

(65) Prior Publication Data

US 2013/0027707 A1    Jan. 31, 2013

(30) Foreign Application Priority Data

Jul. 26, 2011    (JP) .................... 2011-162899

(51) Int. Cl.
| | |
|---|---|
| *G02B 5/28* | (2006.01) |
| *G01J 3/02* | (2006.01) |
| *G02B 26/00* | (2006.01) |
| *G01J 3/10* | (2006.01) |
| *G01J 3/26* | (2006.01) |
| *G01J 3/28* | (2006.01) |
| *G01J 3/32* | (2006.01) |
| *G01J 3/44* | (2006.01) |
| *G01J 3/51* | (2006.01) |

(52) U.S. Cl.
CPC .............. *G01J 3/0291* (2013.01); *G01J 3/027* (2013.01); *G01J 3/0208* (2013.01); *G01J 3/0264* (2013.01); *G01J 3/10* (2013.01); *G01J 3/26* (2013.01); *G01J 3/2823* (2013.01); *G01J 3/32* (2013.01); *G01J 3/44* (2013.01); *G01J 3/51* (2013.01); *G02B 5/284* (2013.01); *G02B 26/001* (2013.01)

(58) Field of Classification Search
CPC .... G01B 26/001; G01J 3/0291; G01J 3/0264; G01J 3/10; G01J 3/26; G01J 3/027; G01J 3/32; G01J 3/44; G01J 3/51; G01J 3/0208; G01J 3/2823; G02B 5/284
USPC ........... 356/519, 454, 506; 359/578, 579, 260
See application file for complete search history.

(56) References Cited

U.S. PATENT DOCUMENTS

| | | | |
|---|---|---|---|
| 6,822,798 B2 * | 11/2004 | Wu et al. | ........................ 359/578 |
| 7,061,661 B2 | 6/2006 | Kowarz et al. | |
| 7,271,945 B2 | 9/2007 | Hagood et al. | |

(Continued)

FOREIGN PATENT DOCUMENTS

| | | |
|---|---|---|
| JP | 11-142752 | 5/1999 |
| JP | 2001-311900 | 11/2001 |

(Continued)

*Primary Examiner* — Michael P Lapage
(74) *Attorney, Agent, or Firm* — Harness, Dickey & Pierce, P.L.C.

(57) ABSTRACT

A filter includes a fixed substrate, a movable substrate opposed to the fixed substrate, a first reflection film provided on a surface of the fixed substrate facing the movable substrate, a second reflection film provided on the movable substrate and opposed to the first reflection film across a gap, a first electrode provided on the surface of the fixed substrate facing the movable substrate, a second electrode provided on the movable substrate and opposed to the first electrode, bonding parts provided on opposing surfaces of the fixed and movable substrates and bonding the fixed substrate to the movable substrate, and a groove part provided in at least one of the opposing surfaces, and the gap is in communication with an exterior of the filter via the groove part.

20 Claims, 10 Drawing Sheets

(56) References Cited

U.S. PATENT DOCUMENTS

| | | |
|---|---|---|
| 7,417,782 B2 | 8/2008 | Hagood et al. |
| 7,502,159 B2 | 3/2009 | Hagood, IV et al. |
| 7,675,665 B2 | 3/2010 | Hagood et al. |
| 7,746,529 B2 | 6/2010 | Hagood et al. |
| 7,852,546 B2 | 12/2010 | Fijol et al. |
| 7,898,714 B2 | 3/2011 | Hagood, IV et al. |
| 2004/0066809 A1* | 4/2004 | Oguri et al. ............ 372/32 |
| 2005/0237538 A1 | 10/2005 | Belleville |
| 2007/0242920 A1* | 10/2007 | Lin et al. ............... 385/27 |
| 2008/0037104 A1 | 2/2008 | Hagood et al. |
| 2008/0283175 A1 | 11/2008 | Hagood et al. |
| 2011/0128549 A1* | 6/2011 | Nishimura et al. ........ 356/450 |
| 2011/0222159 A1* | 9/2011 | Yamazaki ............ 359/589 |
| 2011/0252636 A1* | 10/2011 | Kitahara et al. ........ 29/829 |
| 2011/0255166 A1* | 10/2011 | Shinto et al. .......... 359/577 |

FOREIGN PATENT DOCUMENTS

| | | |
|---|---|---|
| JP | 2002-350631 A | 12/2002 |
| JP | 2003-014641 | 1/2003 |
| JP | 2003-043246 | 2/2003 |
| JP | 2005-062380 | 3/2005 |
| JP | 2006-208791 | 8/2006 |
| JP | 2007-511788 | 5/2007 |
| JP | 2010-517072 | 5/2010 |
| JP | 2011-112998 A | 6/2011 |
| JP | 2011-113000 | 6/2011 |

* cited by examiner

TUNABLE INTERFERENCE FILTER HAVING COMMUNICABLE GROOVE PART, OPTICAL FILTER MODULE, AND PHOTOMETRIC ANALYZER

BACKGROUND

1. Technical Field

The present invention relates to a tunable interference filter, an optical filter module, and a photometric analyzer.

2. Related Art

A known tunable interference filter extracts light having a specific wavelength from light having plural wavelengths.

For example, JP-A-2003-14641 discloses a tunable interference filter having a fixed mirror and a movable mirror provided with a variable gap therebetween for selectively transmitting light having a specific wavelength (hereinafter, such a filter may be referred to as an "etalon").

In a tunable interference filter having the structure of JP-A-2003-14641, when the gap dimension between the fixed mirror and the movable mirror is changed, the movable mirror moves and maintains the gap dimension. As the movable mirror deflects, the movable mirror pushes the air in the space forming the gap. If the channel in which the air is pushed is long or narrow, there have been problems that air resistance (drag by the air) acts in the direction in which the movable mirror moves and the time it takes for the movable mirror to move increases. Accordingly, it takes a longer time to obtain transmission light having a desired wavelength due to the movement of the movable mirror, and the responsiveness of the tunable interference filter is lowered.

SUMMARY

An advantage of some aspects of the invention is to solve at least a part of the problems described above, and the invention can be implemented in the following forms or application examples.

Application Example 1

This application example is directed to a tunable interference filter including a first substrate, a second substrate opposed to the first substrate, a first reflection film formed on a surface of the first substrate facing the second substrate, a second reflection film provided on the second substrate and opposed to the first reflection film across a gap, a first electrode provided on the surface of the first substrate facing the second substrate, a second electrode provided on the second substrate and opposed to the first electrode, bonding parts provided on opposing surfaces of the first substrate and the second substrate and bonding the first substrate to the second substrate, and a groove part provided in at least one of the opposing surfaces of the first substrate and the second substrate, wherein a space forming the gap between the first reflection film and the second reflection film and an outside (an exterior of the filter) communicate via the groove part.

According to the configuration, the groove part is provided in at least one of the opposing surfaces of the first substrate and the second substrate, and the space forming the gap between the first reflection film and the second reflection film and the outside communicate via the groove part.

Accordingly, when the first reflection film and the second reflection film move closer, the air in the space forming the gap flows through the groove part to the outside of the tunable interference filter.

Therefore, the air resistance is minimized when the first reflection film and the second reflection film come closer. Thus, the time in which the first reflection film and the second reflection film come closer is shortened, only a short time is necessary to obtain a transmission light having a desired wavelength, and the responsiveness as a filter is improved.

Application Example 2

In the tunable interference filter according to the application example, it is desirable that a plurality of the groove parts are formed.

According to the configuration, a plurality of the groove parts that communicate the space forming the gap and the outside are formed, and, when the first reflection film and the second reflection film come closer, the air is easily pushed out to the outside of the tunable interference filter from the space forming the gap via the groove parts.

Application Example 3

In the tunable interference filter according to the application example, it is desirable that the groove parts are radially formed at equal angles from a center of the first reflection film or the second reflection film (equal angular intervals relative to the center of the first or second reflection films).

According to the configuration, the groove parts are radially formed at equal angles from the center of the first reflection film or the second reflection film. As such, the air is pushed out uniformly and flows to the outside of the tunable interference filter via the respective groove parts. Accordingly, when the first reflection film and the second reflection film come closer, the air may move with balance in the direction orthogonal to the thickness of the first substrate or the second substrate, and the first reflection film and the second reflection film may be kept parallel.

Application Example 4

In the tunable interference filter according to the application example, it is desirable that the second substrate includes a movable part provided with the second reflection film for varying the gap dimension between the first reflection film and the second reflection film and a connection holding part connected to the movable part and that is thinner than the movable part, and the groove part is formed on the first substrate opposed to the second substrate.

According to the configuration, with the second substrate as the substrate at the movable side, the movable part and the connection holding part connected to the movable part are provided, and the groove part is formed on the first substrate as the substrate at the fixed side.

The connection holding part formed to be thinner than the movable part is provided on the second substrate at the movable side, and the accuracy and the function of the connection holding part may not be maintained if the groove part is formed. However, formation of the groove part is not problematic on the first substrate as the substrate at the fixed side, and there is flexibility of design.

Accordingly, by forming the groove part on the first substrate at the fixed side, the groove part for channeling the air to the outside without constraints of design may be formed.

Application Example 5

In the tunable interference filter according to the application example, it is desirable that plural columnar parts having bonding surfaces that bond the first substrate and the second substrate are formed in the groove part.

According to the configuration, the plural columnar parts are provided in the groove part, and, when the first substrate and the second substrate are bonded, the bonding surfaces of the columnar parts and the first substrate or the second substrate are brought into contact, and deflection of the substrate in the groove part may be prevented.

Further, the contact area between the columnar parts and the substrate increases, and the bonding strength may be improved.

Application Example 6

This application example is directed to an optical filter module including a first substrate, a second substrate opposed to the first substrate, a first reflection film formed on a surface of the first substrate facing the second substrate, a second reflection film provided on the second substrate and opposed to the first reflection film across a gap, a first electrode provided on the surface of the first substrate facing the second substrate, a second electrode provided on the second substrate and opposed to the first electrode, bonding parts provided on opposing surfaces of the first substrate and the second substrate and bonding the first substrate to the second substrate, a groove part provided in at least one of the opposing surfaces of the first substrate and the second substrate, and a light receiving unit that receives light transmitted through the first reflection film or the second reflection film.

According to the configuration, when the first reflection film and the second reflection film come closer, the air in the space forming the gap flows through the groove part to the outside.

Accordingly, the air resistance when the first reflection film and the second reflection film come closer is minimized and the time in which the first reflection film and the second reflection film come closer is shortened. Therefore, the optical filter module with advantageous responsiveness may be provided.

Application Example 7

This application example is directed to a photometric analyzer including a first substrate, a second substrate opposed to the first substrate, a first reflection film formed on a surface of the first substrate facing the second substrate, a second reflection film provided on the second substrate and opposed to the first reflection film across a gap, a first electrode provided on the surface of the first substrate facing the second substrate, a second electrode provided on the second substrate and opposed to the first electrode, bonding parts provided on opposing surfaces of the first substrate and the second substrate and bonding the first substrate to the second substrate, a groove part provided in at least one of the opposing surfaces of the first substrate and the second substrate, a light receiving unit that receives light transmitted through the first reflection film or the second reflection film, and an analytical processing unit that analyzes optical properties of the light based on a signal obtained from the light receiving unit.

According to the configuration, when the first reflection film and the second reflection film come closer, the air in the space forming the gap flows through the groove part to the outside.

Accordingly, the air resistance when the first reflection film and the second reflection film come closer is minimized and the time in which the first reflection film and the second reflection film come closer is shortened. Therefore, the photometric analyzer with advantageous responsiveness may be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments implementing the invention will be explained with reference to the drawings. Note that, the respective drawings used for the following explanation show schematic configurations with dimensional ratios of the respective members appropriately changed for recognizable sizes of the respective members.

First Embodiment

Figure 1:
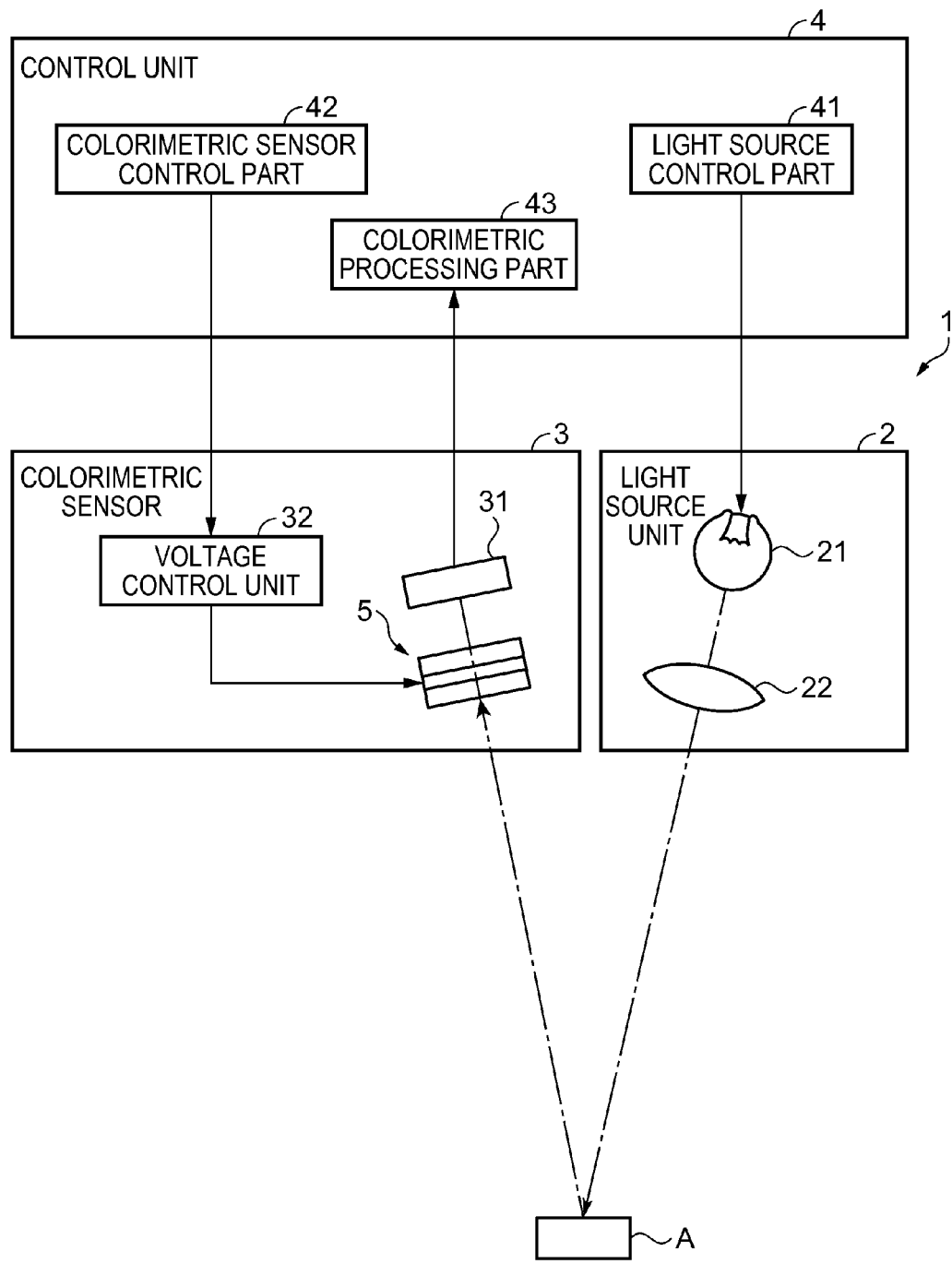
FIG. 1 is a block diagram showing a configuration of a colorimetric instrument of the first embodiment.

Below, the first embodiment according to the invention will be explained according to the drawings.
Schematic Configuration of Colorimetric Instrument FIG. 1 is a block diagram showing a configuration of a colorimetric instrument as a photometric analyzer.

The colorimetric instrument 1 includes a light source unit 2 that applies light to a test object A, a colorimetric sensor 3 (optical filter module), and a control unit 4 that controls the operation of the colorimetric instrument 1.

The colorimetric instrument 1 is a device that applies light to the test object A from the light source unit 2, receives the test object light reflected from the test object A in the colorimetric sensor 3, and analyzes and measures the chromaticity of the test object light based on the detection signal output from the colorimetric sensor 3.
Configuration of Light Source Unit The light source unit 2 includes a light source 21 and plural lenses 22 (only one is shown in FIG. 1), and outputs white light to the test object A. Further, the plural lenses 22 may include a collimator lens, and, in this case, the light source unit 2 brings the light output from the light source 21 into parallel light by the collimator lens and outputs it from a projection lens (not shown) toward the test object A.

Note that, in the embodiment, the colorimetric instrument 1 including the light source unit 2 is exemplified, however, for example, in the case where the test object A is a light emitting member, a colorimetric instrument may be formed without the light source unit 2.

Configuration of Colorimetric Sensor

The colorimetric sensor 3 as an optical filter module includes an etalon (tunable interference filter) 5, a voltage control unit 32 that controls the voltage applied to an electrostatic actuator 56 (see FIG. 3) and varies the wavelength of the light to be transmitted through the etalon 5, and a light receiving unit 31 that receives the light transmitted through the etalon 5.

Further, the colorimetric sensor 3 includes an optical lens (not shown) that guides the reflected light (test object light) reflected on the test object A to the etalon 5. Furthermore, the colorimetric sensor 3 spectroscopically separates the test object light entering the optical lens into light in a predetermined wavelength range by the etalon 5, and the spectroscopically separated light is received in the light receiving unit 31.

The light receiving unit 31 includes a photoelectric conversion element such as a photodiode and generates an electric signal in response to the amount of received light. Further, the light receiving unit 31 is connected to the control unit 4, and outputs the generated electric signal as a light reception signal to the control unit 4.

Configuration of Etalon

Figure 2:
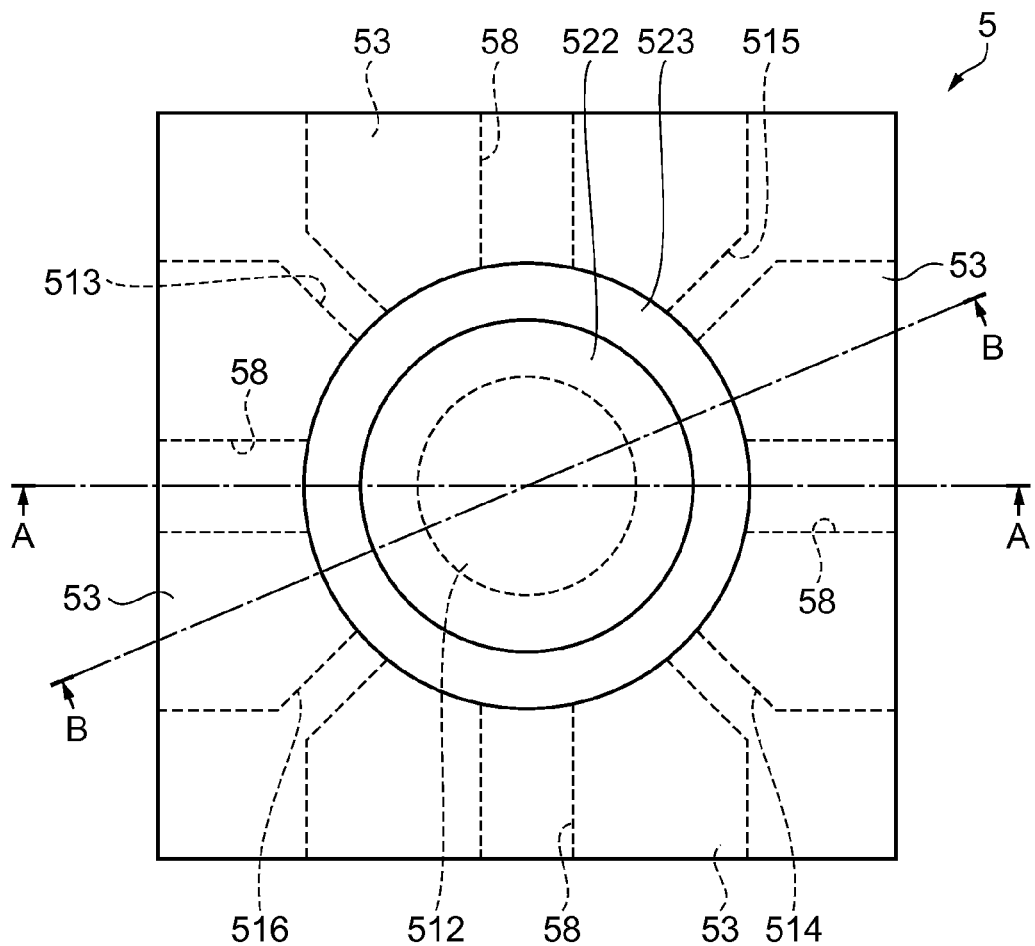
FIG. 2 is a plan view of an etalon according to the first embodiment.
Figure 3:
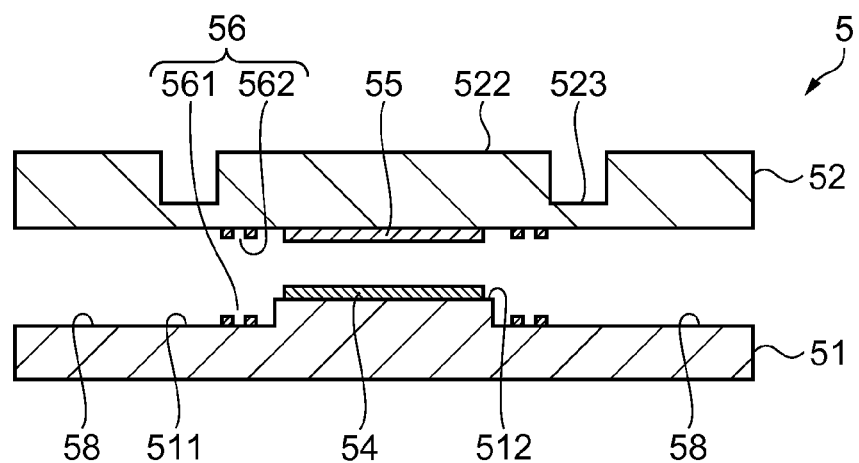
FIG. 3 is a sectional view of the etalon according to the first embodiment.
Figure 4:
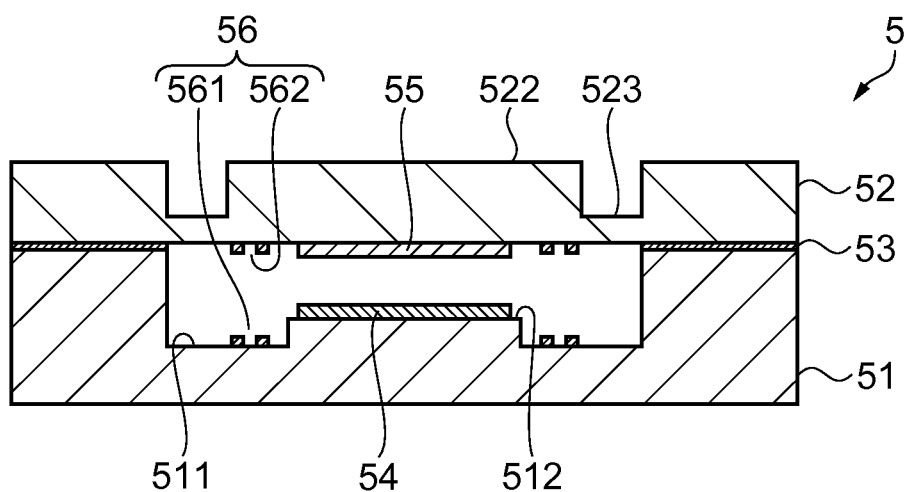
FIG. 4 is a sectional view of the etalon according to the first embodiment.

FIG. 2 is a plan view of the etalon, and FIG. 3 is a sectional view along A-A section in FIG. 2. FIG. 4 is a sectional view along B-B section in FIG. 2. Note that, in FIG. 2, the broken lines show projections and depressions on the surface such as groove parts formed in the fixed substrate, and electrodes, reflection films, and the like formed on the respective substrates, which will be described later.

As shown in FIG. 2, the etalon 5 is a plate-like optical member having a square shape in a plan view, and one side is formed to be 10 mm, for example. The etalon 5 includes a fixed substrate (first substrate) 51 and a movable substrate (second substrate) 52 as shown in FIGS. 3 and 4.

These fixed substrate 51 and movable substrate 52 are respectively formed using base materials of various kinds of glass of soda glass, crystalline glass, quartz glass, lead glass, potassium glass, borosilicate glass, alkali-free glass, and the like or quartz by etching plate-like base materials.

Further, the etalon 5 is integrally formed by bonding the fixed substrate 51 and the movable substrate 52 to each other at bonding parts 53. In the bonding parts 53, plasma-polymerized films are formed on the fixed substrate 51 and the movable substrate 52 and the substrates are fixed by coupling of their plasma-polymerized films. Note that preferably employed as the plasma-polymerized films.

On the opposed surfaces of the fixed substrate 51 and the movable substrate 52, a first reflection film 54 and a second reflection film 55 having reflection characteristics and transmission characteristics of light are provided. Here, the first reflection film 54 is formed on the surface of the fixed substrate 51 facing the movable substrate 52, and the second reflection film 55 is formed on the surface of the movable substrate 52 facing the fixed substrate 51. Further, the first reflection film 54 and second reflection film 55 are oppositely provided across a gap, and a space is provided between the first reflection film 54 and the second reflection film 55.

Further, an electrostatic actuator 56 is provided between the fixed substrate 51 and the movable substrate 52 for adjustment of the gap dimension between the first reflection film 54 and the second reflection film 55.

The electrostatic actuator 56 includes a first electrode 561 provided on the fixed substrate 51 and a second electrode 562 provided on the movable substrate 52.

Note that, in the etalon 5, the distance between the first electrode 561 and the second electrode 562 is set larger than the distance between the first reflection film 54 and the second reflection film 55. For example, in the initial state in which no voltage is applied between the first electrode 561 and the second electrode 562, the distance between the first electrode 561 and the second electrode 562 is set to 2 μm and the distance between the first reflection film 54 and the second reflection film 55 (gap dimension) is set to 0.5 μm. Accordingly, the configuration may suppress a pullin phenomenon that a pulling force sharply increases when the gap dimension between the first electrode 561 and the second electrode 562 becomes minute.

Further, plural groove parts 58 are provided in the etalon 5. The groove parts 58 are formed to extend from the space forming the gap between the first reflection film 54 and the second reflection film 55 to the outer circumference of the etalon 5. Accordingly, the space forming the gap between the first reflection film 54 and the second reflection film 55 and the outside or exterior of the etalon 5 communicate via the groove parts 58.

Next, the configurations of the fixed substrate 51 and the movable substrate 52 will be explained in detail for understanding of the configuration of the etalon 5.

Configuration of Fixed Substrate

Figure 5:
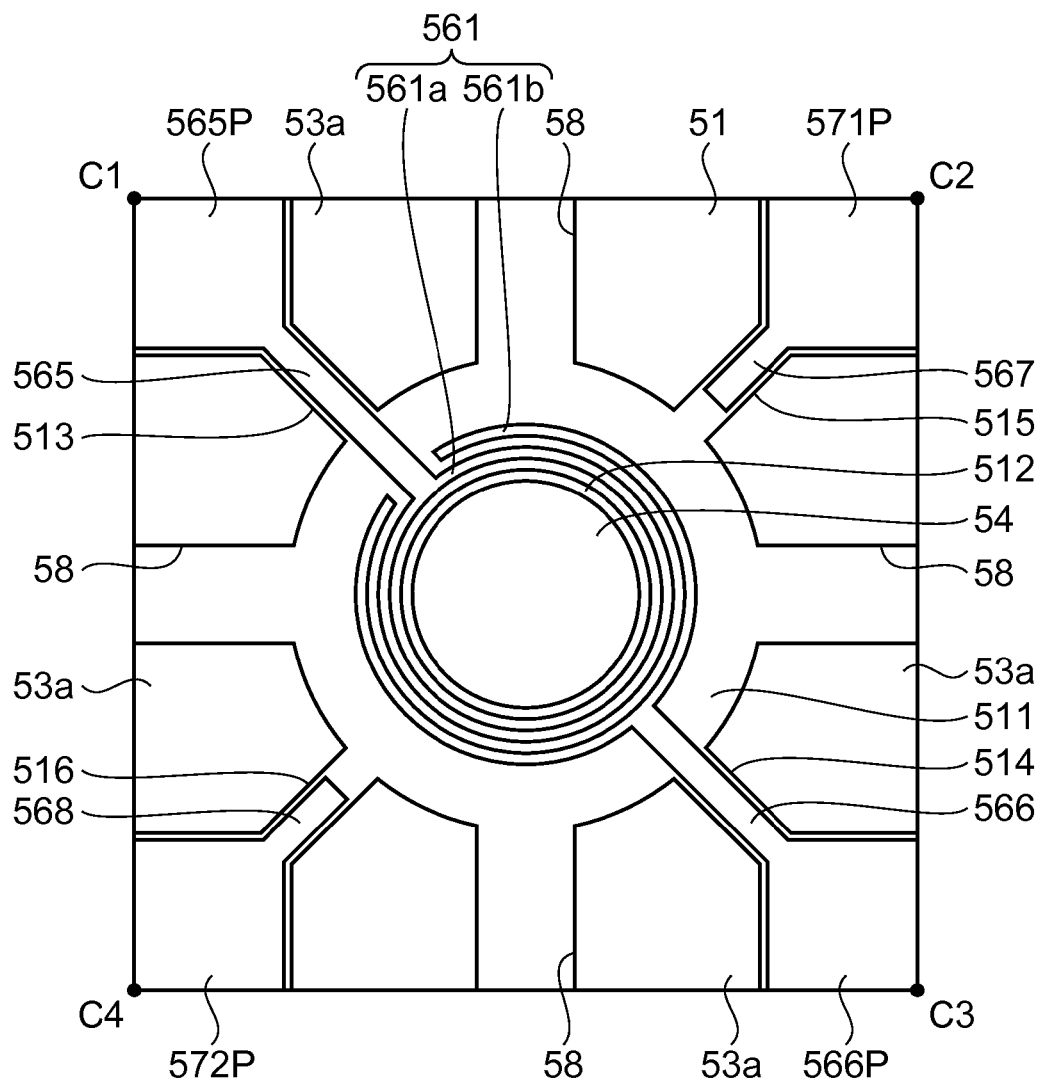
FIG. 5 is a plan view showing a configuration of a fixed substrate of the etalon according to the first embodiment.

FIG. 5 is a plan view showing a configuration of the fixed substrate 51, including the surface facing the movable substrate 52. Below, the fixed substrate 51 will also be explained with reference to FIGS. 3 and 4.

The fixed substrate 51 is formed by etching of a quartz glass base material having a thickness of 500 μm, for example. In the fixed substrate 51, a circular concave part around the center of the fixed substrate 51 is provided by etching, and an electrode formation part 511 and a reflection film formation part 512 are formed (see FIGS. 3 and 4).

The reflection film formation part 512 is formed in the center part of the fixed substrate 51, and the electrode formation part 511 is coaxially or concentrically formed around it. The electrode formation part 511 is etched deeper than the reflection film formation part 512, and the cylindrical reflection film formation part 512 projects.

In the reflection film formation part 512, the first reflection film 54 having a circular shape is formed, and the first reflection film 54 is formed to a thickness of about 100 nm using a metal film of Ag, an Ag alloy, or the like. Note that the first reflection film 54 may have a configuration in which an AgC alloy is used or an AgC alloy or an Ag alloy is stacked on a dielectric film of $TiO_2$ or the like.

Further, the first electrode 561 having an annular shape is formed in the electrode formation part 511. The first electrode 561 includes two electrodes 561a, 561b and they are coaxially or concentrically formed.

The first electrode 561 is a conducting film, and, for example, an ITO (Indium Tin Oxide) film is used. The first electrode 561 may be a Cr/Au film in which a Cr film is used as an under layer and an Au film is stacked thereon. The thickness of the first electrode 561 is formed to about 50 nm.

Lead formation parts 513, 514 extend from the outer circumferential edge of the electrode formation part 511 toward apexes C1, C3 in diagonal locations of the fixed substrate 51. The lead formation parts 513, 514 are formed by etching to be in the same plane with the electrode formation part 511.

A lead electrode 565 connected to the electrode 561a is formed in the lead formation part 513 toward the apex C1. Further, an electrode pad 565P that serves to connect to the outside is formed in a corner part connected to the lead electrode 565 and having the apex C1 of the fixed substrate 51.

A lead electrode 566 connected to the electrode 561b is formed in the lead formation part 514 toward the apex C3. Further, an electrode pad 566P that serves to connect to the outside is formed in a corner part connected to the lead electrode 566 and having the apex C3 of the fixed substrate 51.

In addition, lead formation parts 515, 516 extend from the outer circumferential edge of the electrode formation part 511 toward apexes C2, C4 in diagonal locations of the fixed substrate 51. The lead formation parts 515, 516 are formed by etching to be in the same plane with the electrode formation part 511.

A connection electrode 567 unconnected to the first electrode 561 is formed in the lead formation part 515 toward the apex C2. Further, the connection electrode 567 is connected to an electrode pad 571P that serves to connect to the outside.

Similarly, a connection electrode 568 unconnected to the first electrode 561 is formed in the lead formation part 516 toward the apex C4. Further, the connection electrode 568 is connected to an electrode pad 572P that serves to connect to the outside.

The lead electrodes 565, 566, the connection electrodes 567, 568, and the electrode pads 565P, 566P, 571P, 572P are formed using ITO films of conducting materials, for example. Further, the electrodes may be formed using metal films, and, for example, Cr/Au films, Ag films, Ag alloy films, Al films, or the like may be used.

Further, the groove parts 58 are formed from the outer circumferential edge of the electrode formation part 511 toward the outer circumference of the fixed substrate 51. The groove parts 58 are radially formed at equal angles from the center (at equal angular intervals relative to the center) of the first reflection film 54, and four groove parts 58 are formed with central angles of 90 degrees in the embodiment.

The groove parts 58 are formed to the same depth as the electrode formation part 511. According to the configuration, the groove parts 58 and the electrode formation part 511 may be formed in the same etching process.

Further, in the embodiment, the groove parts 58 are wider and formed in parts at shorter distances to the outer circumference than the lead formation parts 513, 514, 515, 516 for easy flowing of the air.

On the fixed substrate 51, flat parts except the electrode formation part 511, the reflection film formation part 512, the lead formation parts 513, 514, 515, 516, and the groove parts 58 are bonding surfaces 53a as the bonding parts 53 bonding to the movable substrate 52.

On the bonding surfaces 53a, bonding films preferably using polyorganosiloxane as a chief material are provided. As the bonding films, plasma-polymerized films formed by CVD (Chemical Vapor Deposition) or the like are employed.

Configuration of Movable Substrate

Figure 6:
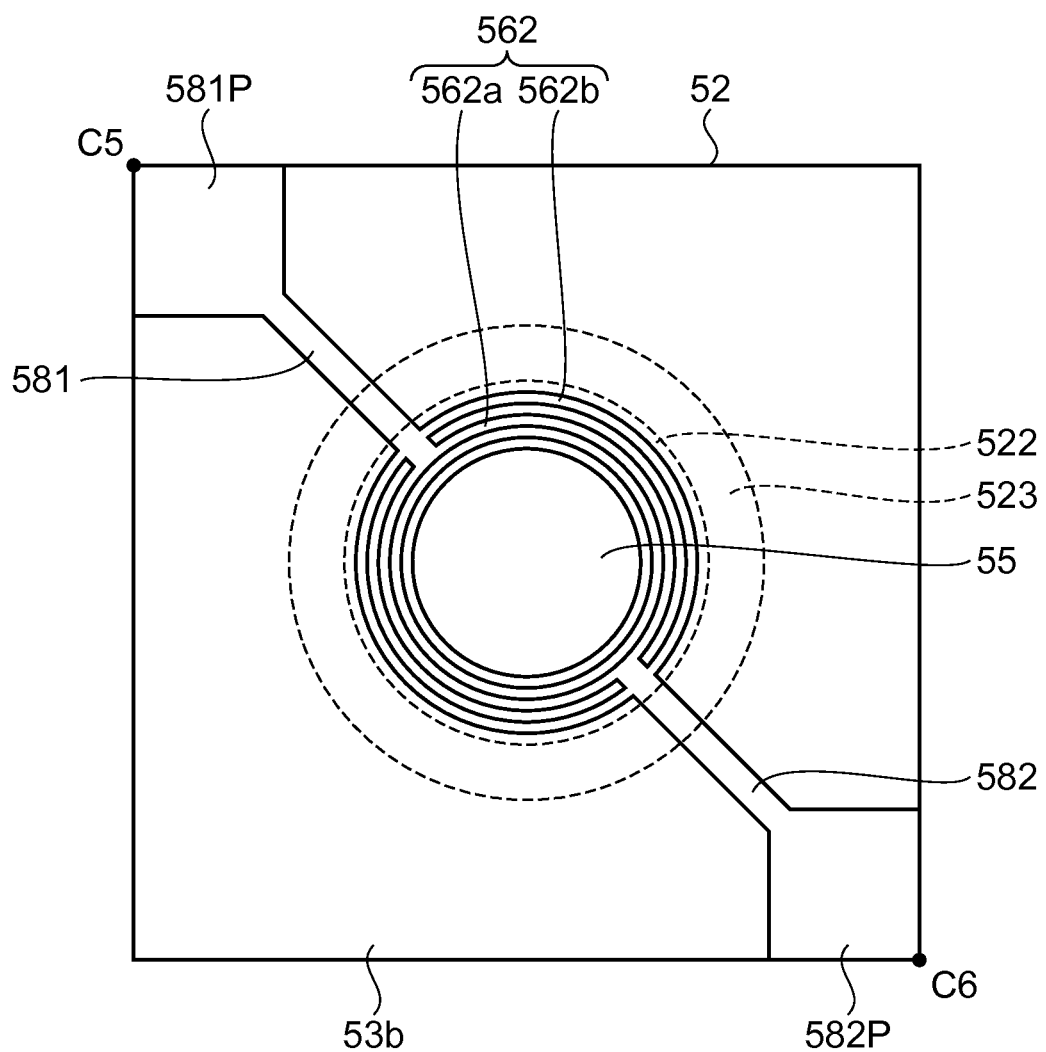
FIG. 6 is a plan view showing a configuration of a movable substrate of the etalon according to the first embodiment.

FIG. 6 is a plan view showing a configuration of the movable substrate, the surface facing the fixed substrate.

The movable substrate 52 is formed by processing one surface of a quartz glass base material having a thickness of 200 μm, for example, by etching.

In the movable substrate 52, a movable part 522 having a cylindrical shape around the substrate center and a connection holding part 523 coaxially holding the movable part 522 around it are formed.

In the connection holding part 523, an annular groove is formed in the opposite surface to the surface facing the fixed substrate 51 to be thinner than the thickness of the movable part 522 (see FIGS. 3 and 4).

As described above, the movable substrate 52 has a diaphragm structure and is arranged so that the movable part 522 may easily move in the thickness direction of the movable substrate 52.

For the surface of the movable substrate 52 facing the fixed substrate 51, a flat surface of the base material is used without an etched surface.

On the surface of the movable part 522 facing the fixed substrate 51, the second reflection film 55 opposed to the first reflection film 54 and the second electrode 562 opposed to the first electrode 561 are provided.

The second reflection film 55 is formed in the center part of the movable part 522, and the second electrode 562 is formed to surround the second reflection film 55.

The second electrode 562 coaxially includes two electrodes 562a, 562b opposed to the first electrode 561 of the fixed substrate 51, and the electrode 562a and the electrode 562b are connected at the same potential.

As a material of the second reflection film 55, Ag or an Ag alloy is used, and an AgC alloy may be used or an AgC alloy or an Ag alloy may be stacked on a dielectric film of $TiO_2$ or the like. Note that the second reflection film 55 is formed to a thickness of about 100 nm.

The second electrode 562 is a conducting film, and, for example, an ITO film is used like the first electrode 561. Further, a metal film such as a Cr/Au film, an Ag film, an Ag alloy film, or an Al film may be used. The second electrode 562 may be provided in the connection holding part 523.

From the second electrode 562, lead electrodes 581, 582 extend toward the apexes C5, C6 in diagonal locations of the movable substrate 52. The apexes C5, C6 have positional relationships opposed to the apexes C2, C4 of the fixed substrate 51.

Further, an electrode pad 581P that serves to connect to the electrode pad 571P of the fixed substrate 51 is formed in a corner part connected to the lead electrode 581 and having the apex C5 of the movable substrate 52. Similarly, an electrode pad 582P that serves to connect to the electrode pad 572P of the fixed substrate 51 is formed in a corner part connected to the lead electrode 582 and having the apex C6 of the movable substrate 52.

As described above, by providing conducting members such as Ag paste between the electrode pad 571P and the electrode pad 581P and between the electrode pad 572P and the electrode pad 582P, the fixed substrate 51 and the movable substrate 52 may be electrically connected.

Further, the parts opposed to the bonding surfaces 53a in the fixed substrate 51 serve as bonding surfaces 53b of the movable substrate 52.

On the bonding surfaces 53b, bonding films preferably using polyorganosiloxane as a chief material are provided. As the bonding films, plasma-polymerized films formed by CVD or the like are employed.

Bonding of Fixed Substrate and Movable Substrate

The bonding of the fixed substrate 51 and the movable substrate 52 explained above is performed by performing $O_2$ plasma or UV treatment, $N_2$ plasma activation treatment, or the like on the bonding films formed on the bonding surfaces 53a, 53b, and then, aligning and superimposing the fixed substrate 51 and the movable substrate 52 and applying load thereon.

As described above, by bonding the fixed substrate 51 and the movable substrate 52, the groove parts 58 serve as paths for air flow and the space between the first reflection film 54 and the second reflection film 55 and the outside of the etalon 5 communicate via the groove parts 58.

Operation of Etalon

In the etalon 5, when the electrostatic actuator 56 is activated to vary the gap dimension between the opposed first reflection film 54 and second reflection film 55, the first electrode 561 and the second electrode 562 attract each other, and the connection holding part 523 deflects and the movable part 522 moves closer to the fixed substrate 51. Concurrently, the air in the space forming the gap is pushed by the movable part 522, and flows through the groove parts 58 to the outside of the etalon 5. The groove parts 58 are radially formed at equal angles from the center of the first reflection film 54, and thus, the air nearly uniformly flows through the respective groove parts 58 to the outside of the etalon 5.

Note that the groove parts 58 are provided at the fixed substrate 51 side in the embodiment, however, the groove parts 58 may be provided at the movable substrate 52 side or at both sides.

Configuration of Control Unit

Returning to FIG. 1, the control unit 4 controls the operation of the colorimetric instrument 1. As the control unit 4, for example, a general-purpose personal computer, a portable information terminal, and additionally, a colorimetry-dedicated computer or the like may be used.

Further, the control unit 4 includes a light source control part 41, a colorimetric sensor control part 42, a colorimetric processing part (analytical processing unit) 43, and the like The light source control part 41 is connected to the light source unit 2. Further, the light source control part 41 outputs a predetermined control signal to the light source unit 2 based on the setting input by a user, for example, and allows the light source unit 2 to output white light with predetermined brightness.

The colorimetric sensor control part 42 is connected to the colorimetric sensor 3. Further, the colorimetric sensor control part 42 sets the wavelength of light to be received by the colorimetric sensor 3 based on the setting input by the user, for example, and outputs a control signal for detection of the amount of received light having the wavelength to the colorimetric sensor 3. Thereby, the voltage control unit 32 of the colorimetric sensor 3 sets the voltage applied to the electrostatic actuator 56 so that the wavelength of the light desired by the user may be transmitted based on the control signal.

The colorimetric processing part 43 controls the colorimetric sensor control part 42 to vary the gap dimension between reflection films of the etalon 5 and change the wavelength of the light to be transmitted through the etalon 5. Further, the colorimetric processing part 43 acquires the amount of light transmitted through the etalon 5 based on the light reception signal input from the light receiving unit 31. Furthermore, the colorimetric processing part 43 calculates the chromaticity of the light reflected from the test object A based on the amount of received lights having the respective wavelengths obtained in the above described manner.

Advantages of First Embodiment

According to the embodiment, there are at least the following advantages.

In the etalon (tunable interference filter) 5 according to the embodiment, the groove parts 58 are provided in the surface of the fixed substrate 51 facing the movable substrate 52 and the space forming the gap between the first reflection film 54 and the second reflection film 55 and the outside communicate via the groove parts 58.

According to the configuration, when the movable part 522 moves closer to the first reflection film 54 by driving of the electrostatic actuator 56, the air in the space forming the gap flows through the groove parts 58 to the outside of the etalon 5.

Accordingly, the air resistance when the movable part 522 is minimized. Therefore, the time in which the first reflection film 54 and the second reflection film 55 come closer is shortened and only a short time is necessary to obtain a transmission light having a desired wavelength, and the responsiveness of the filter is improved.

Further, the groove parts 58 are radially formed at equal angles from the center of the first reflection film 54 or the second reflection film 55, and the air uniformly flows through the respective groove parts 58 to the outside of the etalon 5. Accordingly, when the first reflection film 54 and the second reflection film 55 come closer, the air may move with balance in the direction orthogonal to the thickness of the movable substrate 52, and the first reflection film 54 and the second reflection film 55 may be kept parallel.

Note that, as a method of flowing the air in the movement direction of the movable part 522, a hole may be formed in the second reflection film 55, however, the area of the hole may become noise and measurement accuracy may be reduced. Further, when a hole is formed in the connection holding part 523, the thickness accuracy is difficult to maintain and, as a result, driving accuracy may be reduced.

On the other hand, in the etalon 5 of the embodiment, the groove parts 58 for air flow are provided in the direction crossing the thicknesses of the fixed substrate 51 and the movable substrate 52, in other words, in the direction crossing the movement direction of the movable part 522. As described above, there is no structure for flowing the air at the movable substrate 52 side, and thus, the driving accuracy of the electrostatic actuator 56 may be maintained, and the measurement accuracy of the spectroscopically separated light may be maintained.

Further, in the etalon 5 according to the embodiment, when the etalon 5 is housed within a package having a reduced-pressure atmosphere, there is an advantage that the air within the space forming the gap may be promptly suctioned via the groove parts 58.

The colorimetric sensor 3 as the optical filter module and the colorimetric instrument 1 as the photometric analyzer according to the embodiment include the etalon 5 in which the air in the space forming the gap is ejected through the groove parts 58 to the outside when the first reflection film 54 and the second reflection film 55 come closer.

Accordingly, when the first reflection film 54 and the second reflection film 55 come closer, the air resistance is minimized and the time in which the first reflection film 54 and the second reflection film 55 come closer is shorter. Therefore, the colorimetric sensor 3 and the colorimetric instrument 1 having an advantageous responsiveness may be provided.

Modified Example of Etalon According to First Embodiment

Figure 7:
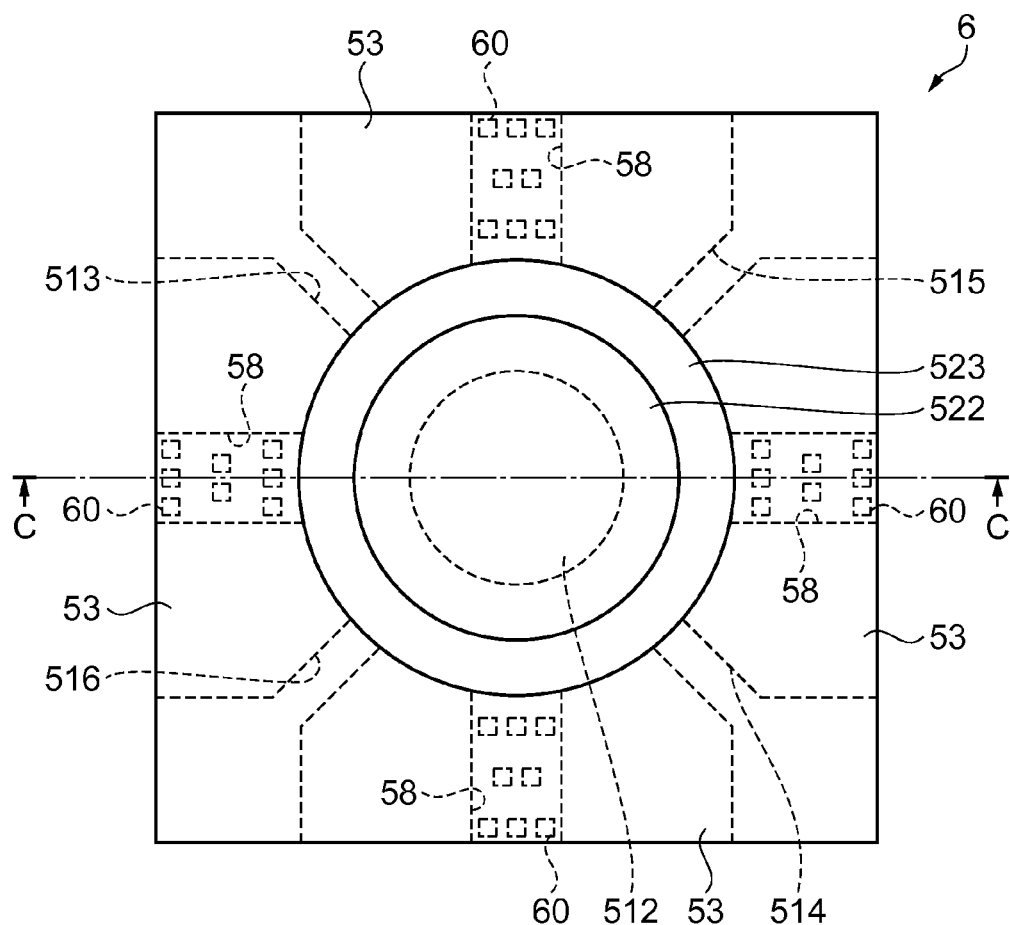
FIG. 7 is a plan view showing a configuration of a modified example of the etalon according to the first embodiment.
Figure 8:
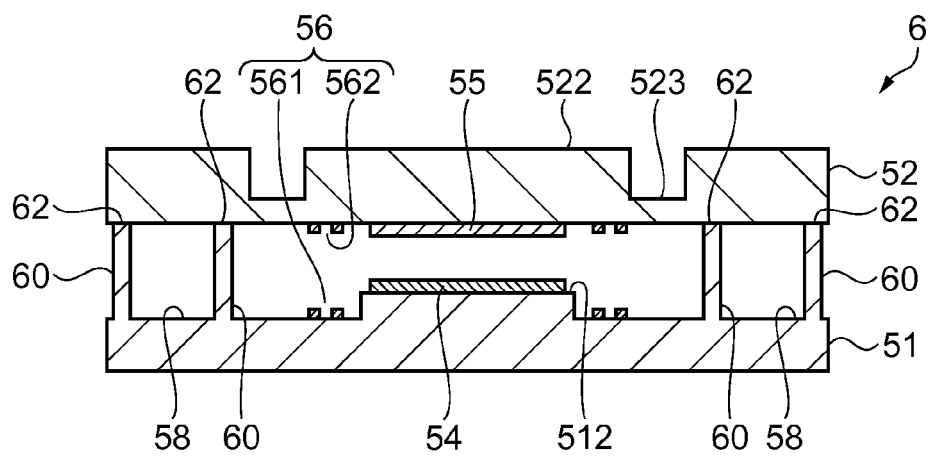
FIG. 8 is a sectional view showing the configuration of the modified example of the etalon according to the first embodiment.

Next, a modified example of the etalon that has been explained in the first embodiment will be explained. FIG. 7 is a plan view showing a modified example of the etalon in the first embodiment. FIG. 8 is a sectional view along C-C section in FIG. 7.

The modified example is different from the first embodiment in that columnar projections are formed in the groove parts. Accordingly, the same configurations as those of the first embodiment have the same reference signs and their explanation will be omitted.

An etalon 6 includes the fixed substrate 51 and the movable substrate 52 bonded to each other.

In the fixed substrate 51, the groove parts 58 are formed and plural columnar parts 60 are formed within the groove parts 58. The columnar parts 60 rise from the bottom surfaces of the groove parts 58, and their end surfaces have flat bonding surfaces 62.

The bonding surfaces 62 of the columnar parts 60 are formed within the same plane with the bonding surfaces 53a of the fixed substrate 51, and bonding films (not shown) are formed on the bonding surfaces 62. Further, in bonding to the movable substrate 52, bonding may be obtained by contact between the bonding films formed on the bonding surfaces 62 and the bonding films formed in corresponding parts of the movable substrate 52.

Note that the arrangement of the columnar parts 60 may be regular or random.

As described above, in the modified example, the groove parts 58 have the plural columnar parts 60, and thus, when the fixed substrate 51 and the movable substrate 52 are bonded, the bonding surfaces 62 of the columnar parts 60 and the movable substrate 52 are brought into contact, and deflection of the movable substrate 52 in the groove parts 58 may be prevented.

Further, the contact area with the substrate increases by the columnar parts 60, and the bonding strength may be improved.

In the first embodiment, the colorimetric instrument 1 has been exemplified as the photometric analyzer, however, the tunable interference filter, the optical filter module, and the photometric analyzer may be used in other various fields.

For example, they may be used as a light-based system for detection of presence of a specific material. As the system, for example, a gas detector such as a vehicle-mounted gas leak detector that detects a specific gas with high sensitivity by employing a spectroscopic measurement method using the etalon (tunable interference filter) or a photoacoustic gas detector for breath test may be exemplified.

Second Embodiment

Below, an example of the gas detector will be explained according to the drawings.

Figure 9:
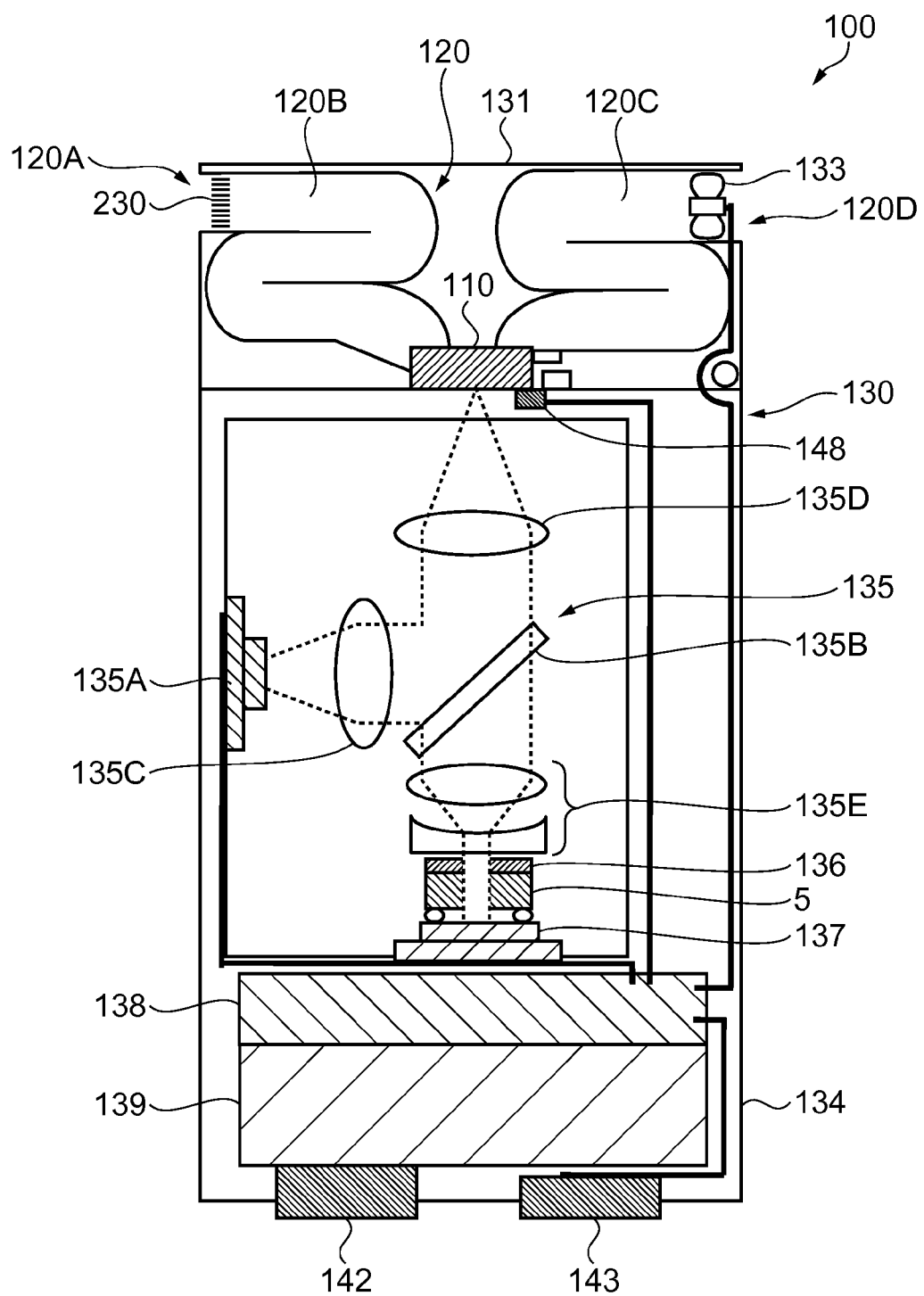
FIG. 9 is a sectional view showing a configuration of a gas detector as a photometric analyzer in the second embodiment.
Figure 10:
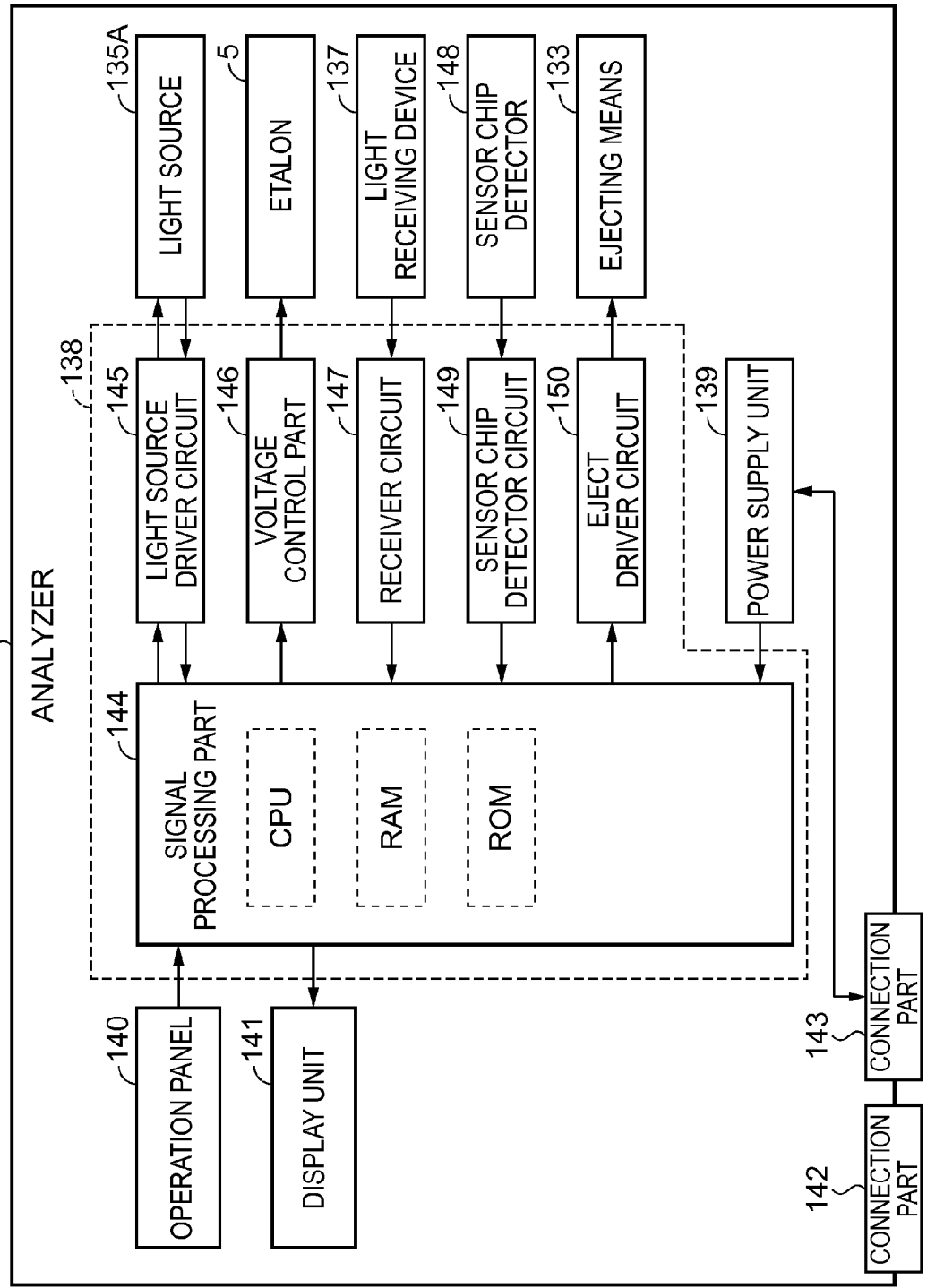
FIG. 10 is a circuit block diagram of the gas detector in the second embodiment.

FIG. 9 is a sectional view showing an example of the gas detector including the etalon. FIG. 10 is a block diagram showing a configuration of a control system of the gas detector.

The gas detector 100 includes a sensor chip 110, a channel 120 having a suction port 120A, a suction channel 120B, an eject channel 120C, and an eject port 120D, and a main body part 130 as shown in FIG. 9.

The main body part 130 includes a detection unit (optical filter module) including a sensor part cover 131 having an opening to which the channel 120 is detachably attached, an ejecting unit 133, a housing 134, an optical unit 135, a filter 136, the etalon (tunable interference filter) 5, a light receiving device 137 (light receiving unit), and the like, a control unit 138 that processes a detected signal and controls the detection unit, a power supply unit 139 that supplies power, and the like Further, the optical unit 135 includes a light source 135A that outputs light, a beam splitter 135B that reflects the light entering from the light source 135A toward the sensor chip 110 side and transmits the light entering from the sensor chip side to the light receiving device 137 side, and lenses 135C, 135D, 135E.

Further, as shown in FIG. 10, in the gas detector 100, an operation panel 140, a display unit 141, a connection part 142 for interface with the outside, and the power supply unit 139 are provided. If the power supply unit 139 is a secondary cell, a connection part 143 for charging may be provided.

Furthermore, the control unit 138 of the gas detector 100 includes a signal processing part 144 having a CPU and the like, a light source driver circuit 145 for control of the light source 135A, a voltage control part 146 for control of the etalon 5, a receiver circuit 147 that receives a signal from the light receiving device 137, a sensor chip detector circuit 149 that receives a signal from a sensor chip detector 148 that reads a code of the sensor chip 110 and detects presence or absence of the sensor chip 110, an eject driver circuit 150 that controls the ejecting unit 133, and the like Next, an operation of the gas detector 100 will be explained below.

Inside of the sensor part cover 131 in the upper part of the main body part 130, the sensor chip detector 148 is provided on and presence or absence of the sensor chip 110 is detected by the sensor chip detector 148. When the signal processing part 144 detects the detection signal from the sensor chip detector 148, the part determines that the sensor chip 110 has been mounted, and outputs a display signal to the display unit 141 for displaying that a detection operation can be performed.

Then, for example, if the operation panel 140 is operated by a user and an instruction signal of starting detection processing is output from the operation panel 140 to the signal processing part 144, first, the signal processing part 144 outputs a signal of light source activation to the light source driver circuit 145 and activates the light source 135A. When the light source 135A is driven, a stable laser beam of linearly-polarized light having a single waveform is output from the light source 135A. Further, a temperature sensor and a light amount sensor are contained in the light source 135A, and their information is output to the signal processing part 144. Then, if the signal processing part 144 determines that the light source 135A is in stable operation based on the temperature and the light amount input from the light source 135A, the part controls the eject driver circuit 150 to activate the ejecting unit 133. Thereby, a gas sample containing a target material (gas molecules) to be detected is guided from the suction port 120A into the suction channel 120B, the sensor chip 110, the eject channel 120C, and the eject port 120D.

The sensor chip 110 is a sensor having plural metal nanostructures incorporated therein and using localized surface plasmon resonance. In the sensor chip 110, when enhanced electric fields are formed between the metal nanostructures by the laser beam and the gas molecules enter the enhanced electric fields, Raman scattering light and Rayleigh scattering light containing information of molecule oscillation are generated.

The Rayleigh scattering light and Raman scattering light enter the filter 136 through the optical unit 135, the Rayleigh scattering light is separated by the filter 136, and the Raman scattering light enters the etalon 5. Then, the signal processing part 144 controls the voltage control part 146 to adjust the voltage applied to the etalon 5 and allow the etalon 5 to spectroscopically separate the Raman scattering light in response to the gas molecules to be detected. Then, when the spectroscopically separated light is received by the light receiving device 137, the light reception signal in response to the amount of received light is output to the signal processing part 144 via the receiver circuit 147.

The signal processing part 144 compares spectrum data of the Raman scattering light in response to the gas molecules to be detected obtained in the above described manner and data stored in a ROM, determines whether or not they are the target gas molecules, and identifies the material. Further, the signal processing part 144 allows the display unit 141 to display the result information and outputs it to the outside from the connection part 142.

In FIGS. 9 and 10, the gas detector 100 that performs spectroscopic separation of the Raman scattering light using the etalon 5 and gas detection from the spectroscopically separated Raman scattering light has been exemplified, however, it may be used as a gas detector that identifies a gas type by detection of absorbance unique to the gas. In this case, a gas sensor that takes a gas inside and detects light absorbed by the gas of the incident lights is used as the optical filter module according to the invention. Further, a gas detector 100 that analyzes and discriminates the gas flowing into the sensor using the gas sensor is the photometric analyzer according to the invention. Even the configuration may detect components of the gas using the tunable interference filter according to the invention.

Further, as a system for detection of presence of a specific material, not limited to the gas detection, but also a material component analyzer such as a non-invasive measurement device of sugar using near-infrared spectroscopy or a non-invasive measurement device of information of foods, living organisms, minerals, or the like may be exemplified.

Third Embodiment

Next, a food analyzer as an example of the material component analyzer will be explained.

Figure 11:
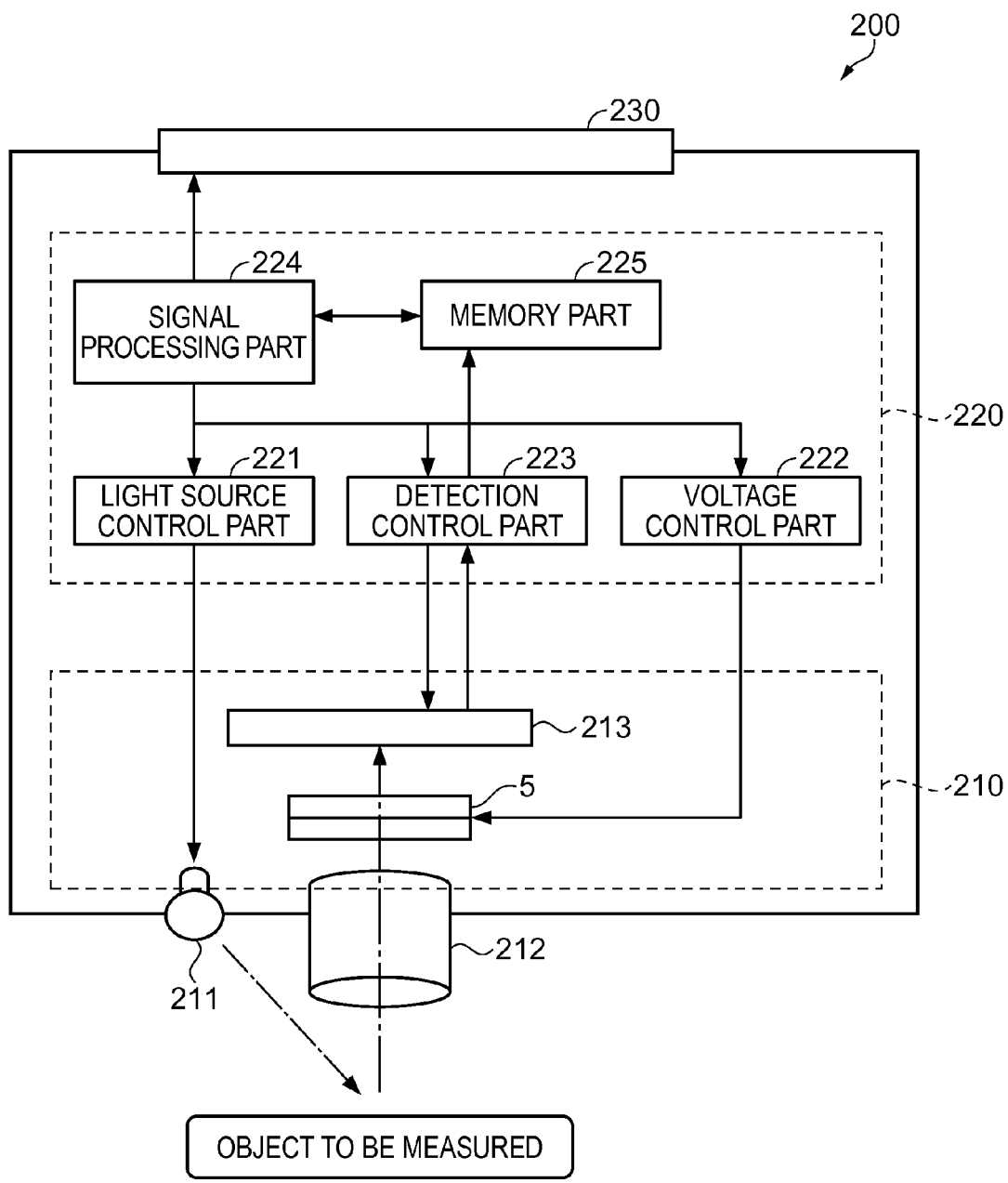
FIG. 11 is a block diagram showing a configuration of a food analyzer as a photometric analyzer in the third embodiment.

FIG. 11 is a block diagram showing a configuration of a food analyzer as an example of the photometric analyzer using the etalon 5.

The food analyzer 200 includes a detector (optical filter module) 210, a control unit 220, and a display unit 230. The detector 210 includes a light source 211 that outputs light, an imaging lens 212 that introduces light from an object to be measured, the etalon (tunable interference filter) 5 that spectroscopically separates the light introduced from the imaging lens 212, and an imaging unit 213 (light receiving unit) that detects the spectroscopically separated light.

Further, the control unit 220 includes a light source control part 221 that performs turn-on and turn-off control and brightness control when turned on of the light source 211, a voltage control part 222 that controls the etalon 5, a detection control part 223 that controls the imaging unit 213 and acquires a spectroscopically separated image imaged by the imaging unit 213, a signal processing part 224, and a memory part 225.

In the food analyzer 200, when the device is driven, the light source 211 is controlled by the light source control part 221, and the object to be measured is irradiated with light from the light source 211. Then, the light reflected by the object to be measured passes through the imaging lens 212 and enters the etalon 5. A voltage that enables spectroscopic separation of a desired wavelength is applied to the etalon 5 under the control of the voltage control part 222, and the spectroscopically separated light is imaged in the imaging unit 213 including a CCD camera and the like, for example. Further, the imaged light is accumulated as spectroscopically separated images in the memory part 225. Furthermore, the signal processing part 224 controls the voltage control part 222 to change the voltage value applied to the etalon 5, and acquires the spectroscopically separated images for the respective wavelengths.

Then, the signal processing part 224 performs computation processing on data of respective pixels in the respective images accumulated in the memory part 225, and obtains spectra in the respective pixels. Further, for example, information on components of foods with respect to the spectra is stored in the memory part 225. The signal processing part 224 analyzes the obtained spectrum data based on the information on the foods stored in the memory part 225, and obtains food components contained in the object to be detected and their contents. Further, from the obtained food components, contents, food calories, freshness, and the like may be calculated. Furthermore, by analysis of the spectrum distribution within the image, extraction of a part in which freshness has been deteriorated in the food to be inspected or the like may be performed, and detection of foreign materials contained within the foods or the like may be performed.

Then, the signal processing part 224 performs processing of allowing the display unit 230 to display the information on the components, contents, calories, freshness, and the like of the food to be inspected obtained in the above described manner.

FIG. 11 shows the example of the food analyzer 200, however, a device having nearly the same configuration may be used as the above described non-invasive measurement device of other information. For example, the device may be used as a living organism analyzer that performs analysis of living organism components such as measurement, analysis, or the like of body fluid components of blood or the like. The living organism analyzer as a device for measurement of the body fluid components of blood or the like, for example, as a device for sensing ethyl alcohol, may be used as a drunk driving prevention device that detects the influence of alcohol of a driver. Further, the device may be used as an electronic endoscopic system including the living organism analyzer.

Furthermore, the device may be used as a mineral analyzer that performs component analyses of minerals.

In addition, the tunable interference filter, the optical filter module, and the photometric analyzer according to the invention may be applied to the following devices.

For example, by changing the intensity of the lights having respective wavelengths with time, data can be transmitted by the lights having the respective wavelengths. In this case, a light having a specific wavelength is spectroscopically separated by the etalon provided in the optical filter module and received by the light receiving unit, and thereby, the data transferred by the light having the specific wavelength may be extracted. Optical communications may be performed by processing the data of the lights having respective wavelengths using the photometric analyzer having the optical filter module for data extraction.

Fourth Embodiment

Further, as another photometric analyzer, the configuration may be applied to a spectroscopic camera, a spectroscopic analyzer, and the like that image spectroscopically separated images by spectroscopic separation of light using the etalon (tunable interference filter) according to the invention. As an example of the spectroscopic camera, there is an infrared camera containing the etalon.

Figure 12:
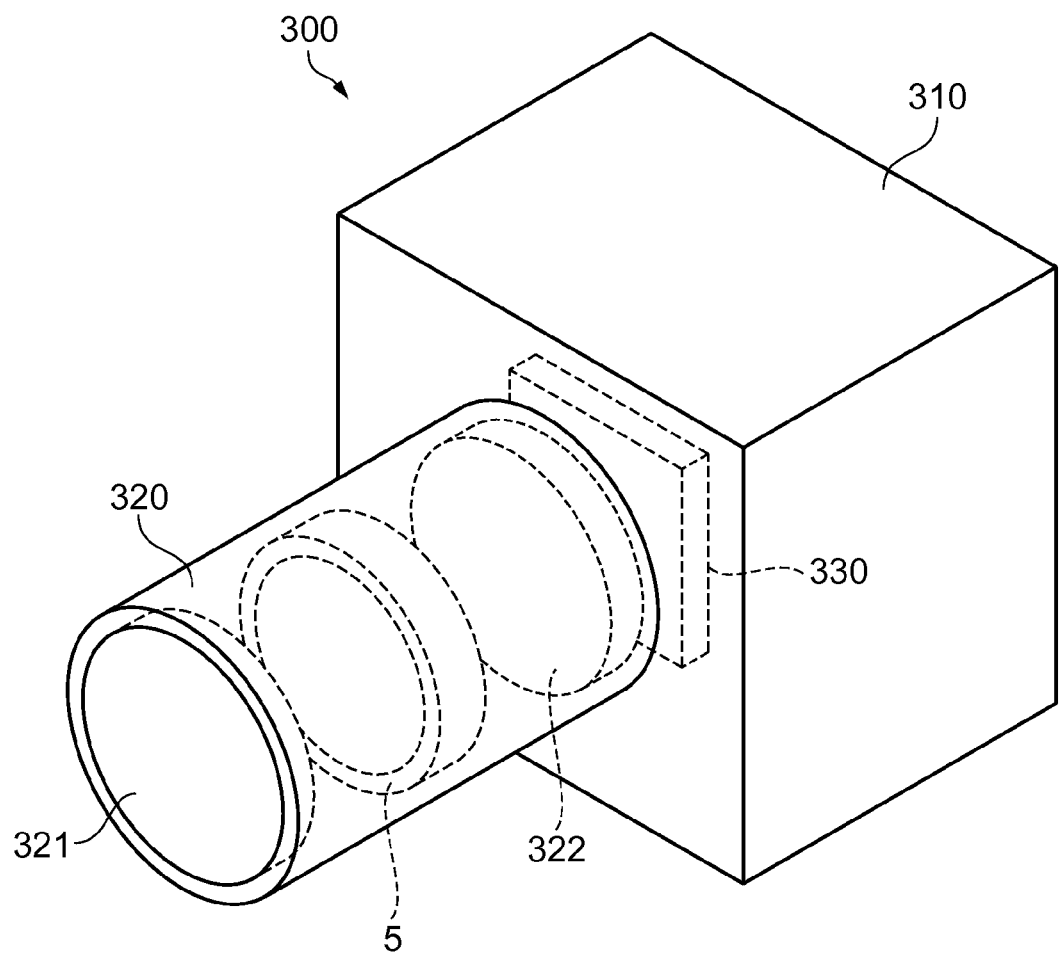
FIG. 12 is a perspective view showing a configuration of a spectroscopic camera as a photometric analyzer in the fourth embodiment.

FIG. 12 is a perspective view showing a configuration of a spectroscopic camera. As shown in FIG. 12, the spectroscopic camera 300 includes a camera main body 310, an imaging lens unit 320, and an imaging unit 330.

The camera main body 310 is a part to be grasped and operated by a user.

The imaging lens unit 320 is provided in the camera main body 310 and guides entering image light to the imaging unit 330. Further, the imaging lens unit 320 includes an objective lens 321, an image forming lens 322, and the etalon 5 provided between these lenses.

The imaging unit 330 includes a light receiving device and images the image light guided by the imaging lens unit 320.

In the spectroscopic camera 300, a light having a wavelength to be imaged is transmitted through the etalon 5, and thereby, a spectroscopically separated image of a light having a desired wavelength may be obtained.

Furthermore, the etalon according to the invention may be used as a bandpass filter, and, for example, may be used as an optical laser device that spectroscopically separates and transmits only lights in a narrow band around a predetermined wavelength of the lights in a predetermined wavelength range output by a light emitting device.

Further, the etalon according to the invention may be used as a biometric identification device, and, for example, may be applied to an identification device of blood vessels, finger prints, retina, iris, or the like using lights in the near-infrared range and the visible range.

Furthermore, the optical filter module and the photometric analyzer may be used as a concentration detector. In this case, the concentration of an object to be inspected in a sample is measured by spectroscopic separation and analysis of infrared energy (infrared light) output from a material using the etalon.

As shown above, the tunable interference filter, the optical filter module, and the photometric analyzer according to the invention may be applied to any device that spectroscopically separates a predetermined light from incident lights.

The invention is not limited to the embodiments that have been explained, and specific structures and procedures when the invention is implemented may appropriately be changed to other structures within a range in which the purpose of the invention may be achieved. Further, many modifications may be made by a person who has ordinary skill in the art within the technical ideas of the invention. For example, various layers may be inserted between the substrate and the reflection layer for various purposes, such as to improve the adhesion of the reflection layer to the substrate.

The entire disclosure of Japanese Patent Application No. 2011-162899 filed Jul. 26, 2011 is incorporated by reference.

What is claimed is:

1. A tunable interference filter comprising:
   a first substrate including an outer circumference having a first side and a second side that intersects with the first side, and a second substrate opposed to the first substrate, the first and second substrates each including first bonding surfaces that are configured to bond the first substrate to the second substrate;
   a first reflection film on a surface of the first substrate facing the second substrate;
   a second reflection film on the second substrate and opposed to the first reflection film across a gap;
   a first electrode on the surface of the first substrate facing the second substrate;
   a second electrode on the second substrate and opposed to the first electrode;
   lead electrode grooves provided in at least one of the first substrate and the second substrate;
   lead electrodes connected to one of first electrode and the second electrode, the lead electrodes passing through the lead electrode grooves; and
   a groove part provided in at least one of the opposing surfaces of the first and second substrates,
   wherein the gap is in communication with an exterior of the filter via the groove part,
   the groove part extends in a direction toward the first side of the outer circumference, and
   a plurality of columnar parts are in the groove part, the plurality of columnar parts having second bonding surfaces that bond the first substrate to the second substrate, and the plurality of columnar parts being formed from the same material as the first and second substrates.

2. The tunable interference filter according to claim 1, wherein a plurality of the groove parts are formed.

3. The tunable interference filter according to claim 2, wherein the groove parts radially extend at equal angular intervals relative to a center of the first or second reflection films.

4. The tunable interference filter according to claim 1, wherein the second substrate further comprises:
   a movable part having the second reflection film mounted thereon, the movable part being adapted to move to vary a distance between the first reflection film and the second reflection film; and
   a connection holding part connected to the movable part, the connection holding part being thinner than the movable part, and
   wherein the groove part is in the first substrate and opposed to the second substrate.

5. The tunable interference filter according to claim 1, wherein the first substrate includes a length L, width W, and a thickness T, and $T<L \leq W$; and
   the groove part extends in one of the length and width directions.

6. The tunable interference filter according to claim 1, wherein the lead electrode grooves are separate and apart from the groove part.

7. An optical filter module comprising:
   a first substrate including an outer circumference having a first side and a second side that intersects with the first side, and a second substrate opposed to the first substrate, the first and second substrates each including first bonding surfaces that are configured to bond the first substrate to the second substrate;
   a first reflection film on a surface of the first substrate facing the second substrate;
   a second reflection film on the second substrate and opposed to the first reflection film across a gap;
   a first electrode on the surface of the first substrate facing the second substrate;
   a second electrode on the second substrate and opposed to the first electrode;
   lead electrode grooves provided in at least one of the first substrate and the second substrate;
   lead electrodes connected to one of first electrode and the second electrode, the lead electrodes passing through the lead electrode grooves;
   a groove part in at least one of the opposing surfaces of the first and second substrates; and
   a light receiving unit that receives light transmitted through the first or second reflection films, and
   wherein the groove part extends in a direction toward the first side of the outer circumference, and
   a plurality of columnar parts are in the groove part, the plurality of columnar parts having second bonding surfaces that bond the first substrate to the second substrate, and the plurality of columnar parts being formed from the same material as the first and second substrates.

8. The optical filter module according to claim 7, wherein the first substrate includes a length L, width W, and a thickness T, and T<L≤W; and the groove part extends in one of the length and width directions.

9. The optical filter module according to claim 7, wherein the lead electrode grooves are separate and apart from the groove part.

10. A photometric analyzer comprising:
a first substrate including an outer circumference having a first side and a second side that intersects with the first side, and a second substrate opposed to the first substrate, the first and second substrates each including first bonding surfaces that are configured to bond the first substrate to the second substrate;
a first reflection film on a surface of the first substrate facing the second substrate;
a second reflection film on the second substrate and opposed to the first reflection film across a gap;
a first electrode on the surface of the first substrate facing the second substrate;
a second electrode on the second substrate and opposed to the first electrode;
lead electrode grooves provided in at least one of the first substrate and the second substrate;
lead electrodes connected to one of first electrode and the second electrode, the lead electrodes passing through the lead electrode grooves;
a groove part provided in at least one of the opposing surfaces of the first and second substrates;
a light receiving unit that receives light transmitted through the first or second reflection films; and
an analytical processing unit that analyzes optical properties of the light based on a signal obtained from the light receiving unit,
wherein the groove part extends in a direction toward the first side of the outer circumference, and
a plurality of columnar parts are in the groove part, the plurality of columnar parts having second bonding surfaces that bond the first substrate to the second substrate, and the plurality of columnar parts being formed from the same material as the first and second substrates.

11. The photometric analyzer according to claim 10, wherein the first substrate includes a length L, width W, and a thickness T, and T<L≤W; and the groove part extends in one of the length and width directions.

12. The photometric analyzer according to claim 10, wherein the lead electrode grooves are separate and apart from the groove part.

13. A tunable interference filter comprising:
a first substrate including an outer circumference having a first side, and a second side that intersects with the first side;
a second substrate opposed to the first substrate;
a first reflection film on a surface of the first substrate facing the second substrate;
a second reflection film on the second substrate and opposed to the first reflection film across a gap;
a first electrode on the surface of the first substrate facing the second substrate;
a second electrode on the second substrate and opposed to the first electrode;
lead electrode grooves provided in at least one of the first substrate and the second substrate;
lead electrodes connected to one of first electrode and the second electrode, the lead electrodes passing through the lead electrode grooves;
first bonding parts on opposing surfaces of the first and second substrates, the first bonding parts being located outboard of the first and second reflection films in a plan view, and bonding the first substrate to the second substrate;
second bonding parts on the second substrate and bonded to the first bonding parts;
a groove part provided in at least one of the opposing surfaces of the first and second substrates; and
a plurality of columnar parts are in the groove part, the plurality of columnar parts having bonding surfaces that bond the first substrate to the second substrate, and the plurality of columnar parts being formed from the same material as the first and second substrates,
wherein the gap is in communication with an exterior of the filter via the groove part, and
wherein the groove part extends in a direction toward the first side of the outer circumference.

14. The tunable interference filter according to claim 13, wherein the first substrate includes a length L, width W, and a thickness T, and T<L≤W; and the groove part extends in one of the length and width directions.

15. The tunable interference filter according to claim 13, wherein the lead electrode grooves are separate and apart from the groove part.

16. A tunable interference filter comprising:
a fixed substrate including an outer circumference having a first side, and a second side that intersects with the first side;
a movable substrate bonded to the fixed substrate with a gap therebetween;
a first reflection film on a surface of the fixed substrate facing the movable substrate;
a second reflection film on the movable substrate and opposed to the first reflection film across the gap;
a first electrode on the surface of the fixed substrate facing the movable substrate;
a second electrode on the movable substrate and opposed to the first electrode;
lead electrode grooves provided in the fixed substrate;
lead electrodes connected to the first electrode, the lead electrodes passing through the lead electrode grooves; and
a passage formed along an interface of the fixed and movable substrates to communicably interconnect the gap with an exterior of the filter,
wherein the passage extends in a direction toward the first side of the outer circumference, and
a plurality of columnar parts are in the passage, the plurality of columnar parts having bonding surfaces that bond the first substrate to the second substrate, and the plurality of columnar parts being formed from the same material as the first and second substrates.

17. The tunable interference filter according to claim 16, wherein the first substrate includes a length L, width W, and a thickness T, and T<L≤W; and the passage extends in one of the length and width directions.

18. The tunable interference filter according to claim 16, wherein the lead electrode grooves are separate and apart from the passage.

19. A tunable interference filter comprising:
a fixed substrate including an outer circumference having a first side, and a second side that intersects with the first side;
a movable substrate bonded to the fixed substrate with a gap therebetween;
a first reflection film above a surface of the fixed substrate facing the movable substrate;
a second reflection film above the movable substrate and opposed to the first reflection film across the gap;
a first electrode above the surface of the fixed substrate facing the movable substrate;
a second electrode above the movable substrate and opposed to the first electrode;
lead electrode grooves provided in the fixed substrate;
lead electrodes connected to the first electrode, the lead electrodes passing through the lead electrode grooves; and
a passage formed along an interface of the fixed and movable substrates to communicably interconnect the gap with an exterior of the filter,
wherein the passage extends in a direction toward the first side of the outer circumference, and
a plurality of columnar parts are in the passage, the plurality of columnar parts having bonding surfaces that bond the first substrate to the second substrate, and the plurality of columnar parts being formed from the same material as the first and second substrates.

20. The tunable interference filter according to claim 19, wherein the first substrate includes a length L, width W, and a thickness T, and $T<L\leq W$; and
the passage extends in one of the length and width directions.

* * * * *